US010946979B2

(12) United States Patent
Bolukbasi

(10) Patent No.: US 10,946,979 B2
(45) Date of Patent: Mar. 16, 2021

(54) APPARATUS FOR CONTROLLING VEHICLE IMPACT ABSORPTION SYSTEMS AND RELATED METHODS

(71) Applicant: The Boeing Company, Chicago, IL (US)

(72) Inventor: Akif O. Bolukbasi, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 307 days.

(21) Appl. No.: 15/953,126

(22) Filed: Apr. 13, 2018

(65) Prior Publication Data

US 2019/0315485 A1    Oct. 17, 2019

(51) Int. Cl.
| | | |
|---|---|---|
| *B64D 45/04* | (2006.01) | |
| *B64D 25/04* | (2006.01) | |
| *B64D 25/06* | (2006.01) | |
| *G08G 5/00* | (2006.01) | |
| *B64C 25/58* | (2006.01) | |
| *B64D 45/00* | (2006.01) | |

(52) U.S. Cl.
CPC .............. *B64D 45/04* (2013.01); *B64C 25/58* (2013.01); *B64D 25/04* (2013.01); *B64D 25/06* (2013.01); *G08G 5/0086* (2013.01); *B64D 2045/008* (2013.01); *B64D 2201/00* (2013.01)

(58) Field of Classification Search
None
See application file for complete search history.

(56) References Cited

U.S. PATENT DOCUMENTS

| 4,408,738 A | 10/1983 | Mazelsky |
| 4,535,877 A | 8/1985 | Shimokura |
| (Continued) | | |

FOREIGN PATENT DOCUMENTS

| EP | 0075067 | 3/1983 |
| EP | 2368797 | 9/2011 |
| (Continued) | | |

OTHER PUBLICATIONS

United States Patent and Trademark Office, "Final Office action," issued in connection with U.S. Appl. No. 15/239,294, dated Dec. 3, 2018, 23 pages. (Copy not provided as this is a USPTO document. Applicant will provide upon request by Examiner.).

(Continued)

*Primary Examiner* — Richard M Camby
(74) *Attorney, Agent, or Firm* — Hanley, Flight & Zimmerman, LLC

(57) ABSTRACT

Apparatus for controlling vehicle impact absorption systems and related methods are disclosed herein. An example apparatus includes a predictor to generate a prediction of an impact event for a vehicle based on data received from sensors of the vehicle. The example apparatus includes an energy absorption allocator to determine an amount of vehicle energy to be absorbed by a crash protection system of the vehicle upon the impact event. The example apparatus includes a communicator to generate an instruction to activate the crash protection system based on the prediction and the amount of vehicle energy to be absorbed by the crash protection system and transmit the instruction to a controller of the crash protection system.

20 Claims, 5 Drawing Sheets

(56) References Cited

U.S. PATENT DOCUMENTS

| | | | |
|---|---|---|---|
| 4,696,489 A | 9/1987 | Fujishiro et al. | |
| 5,139,119 A | 8/1992 | Karnopp | |
| 5,165,838 A | 11/1992 | Kallansrude et al. | |
| 5,303,804 A | 4/1994 | Spiess | |
| RE34,628 E | 6/1994 | Fujishiro et al. | |
| 5,388,614 A | 2/1995 | Hakamada et al. | |
| 5,401,052 A | 3/1995 | Yoshioka et al. | |
| 5,927,646 A | 7/1999 | Sandy et al. | |
| 5,928,300 A * | 7/1999 | Rogers | B60R 21/0132 180/268 |
| H1833 H | 2/2000 | Hoppel et al. | |
| 6,120,009 A | 9/2000 | Gatehouse et al. | |
| 6,328,259 B1 | 12/2001 | Bolukbasi | |
| 6,389,341 B1 | 5/2002 | Davis | |
| 7,720,582 B2 | 5/2010 | Makinadjian | |
| 7,822,522 B2 | 10/2010 | Wereley et al. | |
| 7,866,606 B2 | 1/2011 | Peck | |
| 7,878,312 B2 | 2/2011 | Hiemenz et al. | |
| 8,401,740 B2 | 3/2013 | Hiemenz et al. | |
| 8,588,996 B2 * | 11/2013 | Hill | G05D 1/0055 701/3 |
| 8,886,402 B1 | 11/2014 | Lou | |
| 8,991,569 B1 | 3/2015 | Lou et al. | |
| 8,991,840 B2 | 3/2015 | Zuleger et al. | |
| 70,106,981 | 4/2017 | Bolukbasi et al. | |
| 9,708,057 B2 | 7/2017 | Birchette et al. | |
| 10,053,211 B2 | 8/2018 | Birchette et al. | |
| 10,272,863 B1 * | 4/2019 | Desjardins | B60N 2/24 |
| 10,370,092 B2 | 8/2019 | Bolukbasi et al. | |
| 10,569,865 B2 | 2/2020 | Birchette et al. | |
| 2003/0056997 A1 * | 3/2003 | Breed | B60N 2/015 177/144 |
| 2003/0057318 A1 | 3/2003 | Struzik et al. | |
| 2006/0224285 A1 | 10/2006 | Izawa et al. | |
| 2006/0226289 A1 | 10/2006 | Robbins et al. | |
| 2007/0051850 A1 | 3/2007 | Peck | |
| 2007/0109111 A1 | 5/2007 | Breed et al. | |
| 2007/0152803 A1 | 7/2007 | Huang et al. | |
| 2007/0235911 A1 | 10/2007 | Robbins et al. | |
| 2007/0278723 A1 | 12/2007 | Shoemaker et al. | |
| 2008/0015753 A1 | 1/2008 | Wereley et al. | |
| 2008/0156602 A1 | 7/2008 | Hiemenz et al. | |
| 2008/0195261 A1 | 8/2008 | Breed | |
| 2010/0017057 A1 | 1/2010 | Izawa et al. | |
| 2010/0179730 A1 | 7/2010 | Hiemenz et al. | |
| 2010/0230989 A1 | 9/2010 | Cantor et al. | |
| 2011/0024601 A1 | 2/2011 | Shoemaker et al. | |
| 2011/0035118 A1 * | 2/2011 | Hiemenz | B64D 11/0689 701/45 |
| 2012/0101666 A1 * | 4/2012 | Hill | B64D 25/00 701/3 |
| 2012/0223551 A1 | 9/2012 | Amante et al. | |
| 2013/0197755 A1 | 8/2013 | Otake et al. | |
| 2014/0077519 A1 | 3/2014 | Cantor et al. | |
| 2014/0203602 A1 | 7/2014 | Robbins et al. | |
| 2015/0041584 A1 | 2/2015 | Lu et al. | |
| 2015/0239554 A1 | 8/2015 | Birchette et al. | |
| 2016/0086391 A1 | 3/2016 | Ricci | |
| 2016/0121765 A1 | 5/2016 | Desjardins et al. | |
| 2017/0106981 A1 * | 4/2017 | Bolukbasi | B64D 11/0619 |
| 2017/0182917 A1 | 6/2017 | Taylor et al. | |
| 2017/0297684 A1 | 10/2017 | Birchette et al. | |
| 2018/0050794 A1 | 2/2018 | Bolukbasi et al. | |
| 2019/0071169 A1 | 3/2019 | Birchette et al. | |

FOREIGN PATENT DOCUMENTS

| | | |
|---|---|---|
| JP | S6439272 | 2/1989 |
| JP | H10278529 | 10/1998 |
| JP | 2007191066 | 8/2007 |
| JP | 201095211 | 4/2010 |
| JP | 2011230718 | 11/2011 |
| WO | 2011060061 | 5/2011 |
| WO | 2013120142 | 8/2013 |

OTHER PUBLICATIONS

United States Patent and Trademark Office, "Advisory action," issued in connection with U.S. Appl. No. 15/239,294, dated Jan. 22, 2019, 3 pages. (Copy not provided as this is a USPTO document. Applicant will provide upon request by Examiner.).

United States Patent and Trademark Office, "Non-final Office action," issued in connection with U.S. Appl. No. 14/883,912, dated Dec. 26, 2018, 23 pages. (Copy not provided as this is a USPTO document. Applicant will provide upon request by Examiner.).

Wijngaart et al., "A Seat Microvalve Nozzle for Optimal Gas Flow Capacity at Large Controlled Pressure," 17th IEEE International Conference on Micro Electro Mechanical Systems. Maastricht MEMS 2004 Technical Digest, 4 pages.

European Patent Office, "Communication Pursuant to Article 94(3) EPC," issued in connection with European Application No. 16193736.2, dated Mar. 1, 2019, 5 pages.

United States Patent and Trademark Office, "Non-Final Office Action," issued in connection with U.S. Appl. No. 15/239,294, dated Mar. 7, 2019, 16 pages. (Copy not provided as this is a USPTO document. Applicant will provide document upon request from Examiner.).

United States Patent and Trademark Office, "Notice of Allowance and Fee(s) Due," issued in connection with U.S. Appl. No. 15/239,294, dated Jun. 19, 2019, 15 pages. (Copy not provided as this is a USPTO document. Applicant will provide document upon request from Examiner.).

United States Patent and Trademark Office, "Final Office action," issued in connection with U.S. Appl. No. 14/883,912, dated Jun. 28, 2019, 11 pages. (Copy not provided as this is a USPTO document. Applicant will provide document upon request from Examiner.).

United States Patent and Trademark Office, "Notice of Allowance," issued in connection with U.S. Appl. No. 16/104,608, dated Oct. 9, 2019, 5 pages. (Copy not provided as this is a USPTO document. Applicant will provide document upon request from Examiner.).

United States Patent and Trademark Office, "Non-Final Office Action," issued in connection with U.S. Appl. No. 16/104,608, dated Jun. 21, 2019, 6 pages. (Copy not provided as this is a USPTO document. Applicant will provide document upon request from Examiner.).

European Patent Office, "Extended European Search Report," issued in connection with European Patent Application No. 17172646.6, dated Mar. 16, 2018, 9 pages.

United States Patent and Trademark Office, "Notice of Allowance," issued in connection with U.S. Appl. No. 15/637,645, dated Apr. 19, 2018, 12 pages. (Copy not provided as this is a USPTO document. Applicant will provide document upon request from Examiner.).

United States Patent and Trademark Office, "Non-final Office action," issued in connection with U.S. Appl. No. 14/883,912, dated May 31, 2018, 19 pages. (Copy not provided as this is a USPTO document. Applicant will provide document upon request from Examiner.).

United States Patent and Trademark Office, "Non-final Office action," issued in connection with U.S. Appl. No. 15/239,294, dated May 18, 2018, 23 pages. (Copy not provided as this is a USPTO document. Applicant will provide document upon request from Examiner.).

J.B. Leonard, "The All-Electric Fighter Airplane Flight Control Issues, Capabilities, and Projections," IEEE Transactions on Aerospace and Electronic Systems (1984), vol. AES-20, Issue 3, pp. 234-242 (9 pages).

Roll et al., "Design, Fabrication, and Experiments of an Electromagnetic Actuator for Flapping Wing Micro Air Vehicles," 2013 IEEE International Conference on Robotics and Automation (2013), pp. 809-815 (7 pages).

Hikasa et al., "Detail and Experimental Results of Ferromagnetic Levitation System of Japan Air Lines HSST-01/02 Vehicles," IEEE Transactions on Vehicular Technology (1980), vol. 29, Issue: 1, pp. 35-41 (7 pages).

Federal Service for Intellectual Property, "Notification of Results of Assessment of Patentability of the Invention," issued in connection with Russian Patent Application No. 2016131230, dated Dec. 9, 2019, 11 pages (includes English translation).

(56) References Cited

OTHER PUBLICATIONS

European Patent Office, "Communication pursuant to Article 94(3) EPC," issued in connection with International Application No. 16 193 736.2, dated Feb. 7, 2018, 4 pages.

Leonard, J.B., "The All-Electric Fighter Airplane Flight Control Issues, Capabilities, and Projections," IEEE Transactions on Aerospace and Electronic Systems, vol. AES-20, Issue: 3 (1984), pp. 234-242. (Abstract only provided).

Roll, J. et al., "Design, Fabrication, and Experiments of an Electromagnetic Actuator for Flapping Wing Micro Air Vehicles," 2013 IEEE International Conference on Robotics and Automation (2013), pp. 809-815. (Abstract only provided).

Hikasa Y. et al., "Detail and Experimental Results of Ferromagnetic Levitation System of Japan Air Lines HSST-01/-02 Vehicles," IEEE Transactions on Vehicular Technology, vol. 29, Issue: 1 (1980), pp. 35-41. (Abstract only provided).

United States Patent and Trademark Office, "Final Office action," issued in connection with U.S. Appl. No. 15/637,645, dated Feb. 12, 2018, 6 pages. (Copy not provided as this is a USPTO document. Applicant will provide document upon request from Examiner.).

United States Patent and Trademark Office, "Non-Final Office action," issued in connection with U.S. Appl. No. 15/637,645, dated Sep. 14, 2017, 6 pages. (Copy not provided as this is a USPTO document. Applicant will provide document upon request from Examiner.).

United States Patent and Trademark Office, "Non-Final Office action," issued in connection with U.S. Appl. No. 14/883,912, dated Apr. 21, 2017, 20 pages. (Copy not provided as this is a USPTO document. Applicant will provide document upon request from Examiner.).

United States Patent and Trademark Office, "Final Office action," issued in connection with U.S. Appl. No. 14/883,912, dated Oct. 26, 2017, 16 pages. (Copy not provided as this is a USPTO document. Applicant will provide document upon request from Examiner.).

Romeo et al., "Design of inter-city transport aircraft powered by fuel cell & flight test of zero emission 2-seater aircraft powered by fuel cells," IEEE Conference Publications: Electrical Systems for Aircraft, Railway and Ship Propulsion (2012), pp. 1-7 (7 pages).

Murad et al., "Modeling and simulation of an advanced intelligent restraint system," 33rd Annual IEEE Systems Conference (2009), pp. 333-337 (5 pages).

De Backer et al., "Power absorption by closely spaced point absorbers in constrained conditions," IET Renewable Power Generation, vol. 10, Issue 4 (2010), pp. 579-591 (13 pages).

Tyrell et al., "Preparations for a train-to-train impact test of crash-energy management passenger rail equipment," Proceedings of the 2005 ASME/IEEE Joint Rail Conference (2005), pp. 107-116 (10 pages).

European Patent Office, "Extended European Search Report," issued in connection with European Patent Application No. 16193736.2, dated Apr. 7, 2017, 10 pages.

European Patent Office, "Extended European Search Report," issued in connection with European Patent Application No. 15153229.8, dated Jul. 16, 2015, 8 pages.

United States Patent and Trademark Office, "Restriction Requirement," issued in connection with U.S. Appl. No. 14/188,589, dated Oct. 26, 2015, 6 pages, (Copy not provided as this is a USPTO document, Applicant will provide document upon request from Examiner.).

United States Patent and Trademark Office, "Non-Final Office action," issued in connection with U.S. Appl. No. 14/188,589, dated Feb. 16, 2016, 14 pages. (Copy not provided as this is a USPTO document. Applicant will provide document upon request from Examiner.).

United States Patent and Trademark Office, "Final Office action," issued in connection with U.S. Appl. No. 14/188,589, dated Jun. 2, 2016, 22 pages. (Copy not provided as this is a USPTO document. Applicant will provide document upon request from Examiner.).

United States Patent and Trademark Office, "Advisory action," issued in connection with U.S. Appl. No. 14/188,589, dated Aug. 17, 2016, 4 pages. (Copy not provided as this is a USPTO document. Applicant will provide document upon request from Examiner.).

United States Patent and Trademark Office, "Non-final Office action," issued in connection with U.S. Appl. No. 14/188,589, dated Oct. 14, 2016, 17 pages. (Copy not provided as this is a USPTO document. Applicant will provide document upon request from Examiner.).

United States Patent and Trademark Office, "Notice of Allowance," issued in connection with U.S. Appl. No. 14/188,589, dated Mar. 6, 2017, 9 pages. (Copy not provided as this is a USPTO document. Applicant will provide document upon request from Examiner.).

United States Patent and Trademark Office, "Examiner's Answer to Appeal Brief," issued in connection with U.S. Appl. No. 14/883,912, dated Feb. 7, 2020, 8 pages. (Copy not provided as this is a USPTO document. Applicant will provide document upon request from Examiner.).

United States Patent and Trademark Office, "Decision on Appeal," issued in connection with U.S. Appl. No. 14/883,912, dated Feb. 2, 2021, 10 pages.

\* cited by examiner

APPARATUS FOR CONTROLLING VEHICLE IMPACT ABSORPTION SYSTEMS AND RELATED METHODS

STATEMENT REGARDING FEDERALLY SPONSORED RESEARCH OR DEVELOPMENT

This disclosure was made with Government support under contract number W911W6-10-2-0003 awarded by the Department of Defense. The government has certain rights in this disclosure.

FIELD OF THE DISCLOSURE

This disclosure relates generally to vehicle crash protection systems and, more particularly, to apparatus for controlling vehicle impact absorption systems and related methods.

BACKGROUND

A vehicle, such as an aircraft, includes crash protection systems such as seat energy absorbers and dampers associated with landing gear to absorb or substantially absorb energy upon impact. Known crash protection subsystems are typically designed for specific impact conditions, such as crash impacts on rigid surfaces at particular impact velocities by an aircraft having a particular gross weight. However, crash conditions can vary with respect to, for instance, terrain, altitude, velocity, and changes in aircraft parameter(s) during flight (e.g., reduction in a weight of the aircraft as fuel is burned and/or cargo is released). Further, some crash protection systems of a vehicle such as an aircraft are activated independently of one another.

SUMMARY

An example apparatus includes a predictor to generate a prediction of an impact event for a vehicle based on data received from sensors of the vehicle. The example apparatus includes an energy absorption allocator to determine an amount of vehicle energy to be absorbed by a crash protection system of the vehicle upon the impact event. The example apparatus includes a communicator to generate an instruction to activate the crash protection system based on the prediction and the amount of vehicle energy to be absorbed by the crash protection system and transmit the instruction to a controller of the crash protection system.

An example method includes predicting, by executing an instruction with a processor, an impact event for an aircraft based on sensor data received from sensors of the aircraft. The example method includes determining, by executing an instruction with the processor, respective amounts of aircraft energy to be absorbed by a first crash protection system of the aircraft and a second crash protection system of the aircraft. The example method includes selectively activating, by executing an instruction with the processor, first crash protection system and the second crash protection system based on the respective amounts of energy to be absorbed by each of the first and second crash protection systems.

An example aircraft includes a plurality of sensors to generate sensor data during flight of the aircraft. The example apparatus includes a first controller to control a first crash protection system and a second controller to control a second crash protection system. The example apparatus includes a third controller in communication with the first controller and the second controller. The third controller is to generate a prediction of a crash event for the aircraft based on the sensor data and transmit an instruction to at least one of the first controller to activate the first crash protection system or the second controller to activate the second crash protection system based on the prediction.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
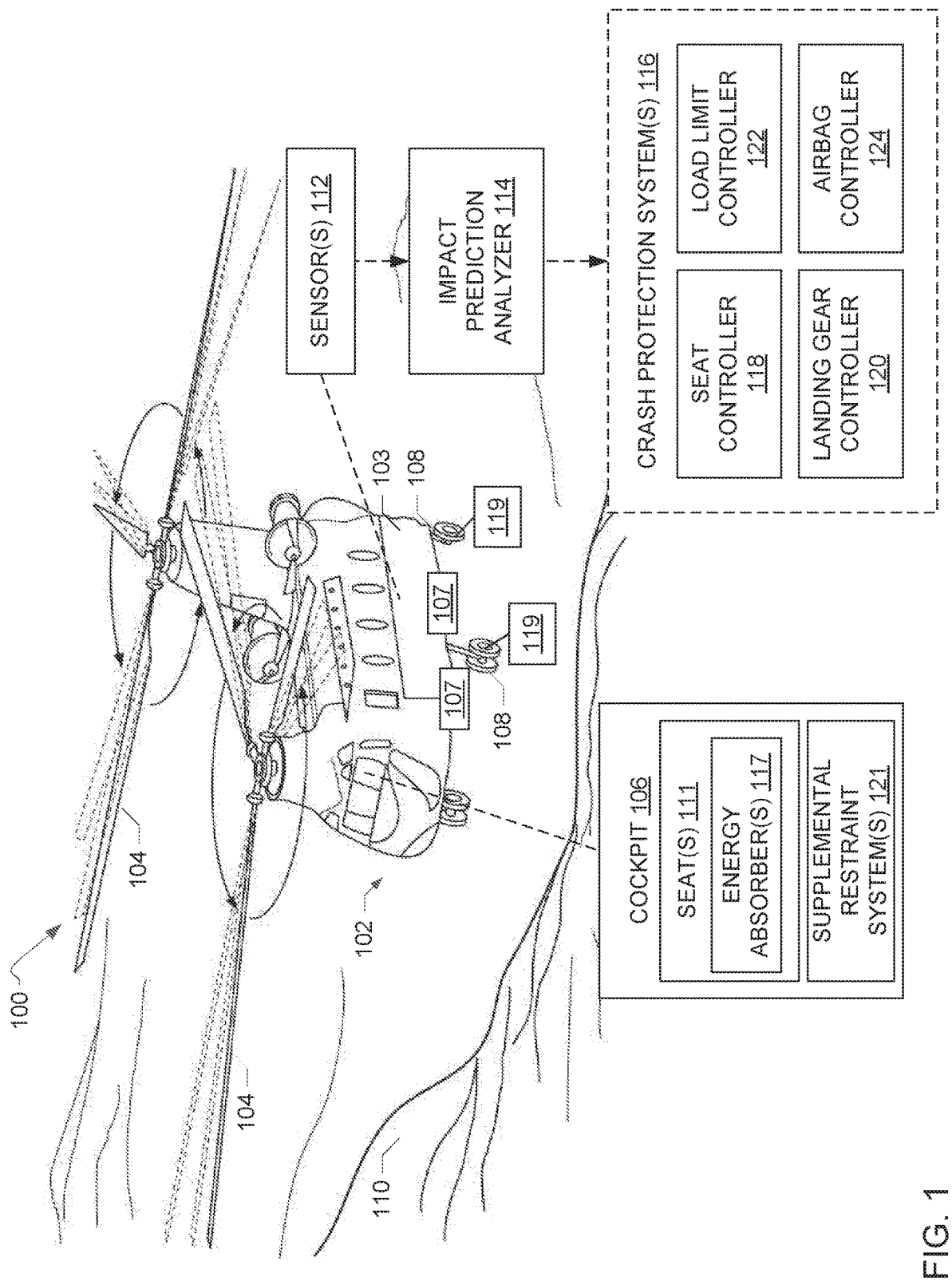
FIG. 1 illustrates an example aircraft including sensors for detecting aircraft conditions and a processing unit for predicting impact of the aircraft on a terrain.

A vehicle such as an aircraft includes various crash protection systems that seek to reduce injury to the occupant(s) of the aircraft and structural damage to the aircraft in the event of a crash impact. Example crash protection systems include energy absorbers (e.g., dampers) associated with aircraft seat(s) and/or landing gear that absorb kinetic energy of the aircraft upon impact. Some known crash protection systems are passive designs that are typically designed for specific impact conditions, aircraft gross weight, and impact velocity and attitude on rigid impact surfaces. These passive designs do not dynamically respond to changing aircraft and/or environmental conditions at impact.

Some known crash protection systems include controllers to manage one or more settings or parameters of the respective crash protection systems, such as stroke load(s) of the energy absorber(s), based on, for instance, feedback from sensor(s) associated with aircraft. However, each of the controllers of the respective crash protection system typically executes decision-making processes independent of other controllers.

Examples disclosed herein provide for prediction and mitigation of a crash impact event by a vehicle such as an aircraft. Based on sensor data collected by a plurality of aircraft sensors during flight, such as velocity, acceleration, gross weight, examples disclosed herein predict whether the aircraft is likely to experience an impact event. Some examples disclosed herein analyze the sensor data at particular sampling intervals to verify and/or revise the crash event projection for the aircraft based on the latest sensor data measured for the aircraft.

Some examples disclosed herein generate alerts that can be output to the aircraft crew upon predicting that a crash event is likely. If recovery of the aircraft is not detected and/or if the sensor data continues to indicate that a crash is likely, examples disclosed herein determine how to allocate the kinetic impact energy of the aircraft between the crash protection systems of the aircraft to mitigate the crash impact. Some examples disclosed herein analyze terrain data (e.g., digital maps) in connection with GPS data for the aircraft to predict the type of surface the aircraft is likely to impact, such as water, soft soil, rock, etc. Some examples disclosed herein use the terrain data to allocate the kinetic energy between the crash protection systems to increase effectiveness of the systems in responding to the impact based on real-time impact conditions. Thus, examples disclosed herein account for effects of different terrains on the aircraft behavior upon impact.

Some disclosed examples determine parameters or settings for the crash protection system(s) (e.g., stroke load) based on the energy distribution between the systems. Examples disclosed herein generate instructions to activate one or more crash protection systems and transmit the instructions to the controller(s) of the respective system(s). Some examples disclosed herein continue to monitor the aircraft sensor data after selecting certain crash protection system(s) to activate. Based on the monitoring, examples disclosed herein determine if additional crash protection systems should be activated to mitigate injury to the occupants and reduce damage to the aircraft.

Although examples disclosed herein are discussed in the context of aircraft, examples disclosed herein may be implemented in the context of other vehicles (e.g., cars, trucks) including crash protection system(s).

FIG. 1 illustrates an example aircraft (e.g., a rotorcraft) 100 in which example disclosed herein may be implemented. The aircraft 100 of the illustrated example includes a fuselage 102, rotors 104, a cockpit 106 of the fuselage 102, major mass item load limiters 103, external airbags 107, and landing gear 108. In the view of FIG. 1, the aircraft 100 is about to impact terrain 110. The impact terrain 110 may be rigid surface, such as rock, or a soft terrain, such soft soil or water. As a result of the impact, the aircraft 100 is subjected to impact forces. Further, occupant(s) within the cockpit 106 can be subjected to impact forces and/or accelerations/decelerations that may translate through seat(s) 111 on which the occupant(s) are sifting.

The example aircraft 100 includes a plurality of sensors 112 to collect data during flight. For example, the sensors 112 can include sensors to monitor pitch, raw, and roll; velocity; acceleration; engine torque; and aircraft weight. The senor(s) 112 can include GPS sensor(s) and radar altimeter(s) to track the position of the aircraft 100 relative to the terrain 110.

In the example of FIG. 1, data generated by the sensor(s) 112 is transmitted (e.g., via one or more wired or wireless connections) to an impact prediction analyzer 114. The impact prediction analyzer 114 can be implemented by one or more processors. Based on the sensor data, the example impact prediction analyzer 114 of FIG. 1 predicts the likelihood of an impending crash event for the aircraft 100. If the impact prediction analyzer 114 predicts that a crash event is likely to occur, the impact prediction analyzer 114 generates instruction(s) to controllers of various crash protection systems 116 that provide for absorption of the impact energy experienced by the aircraft 100 and the occupant(s) upon impact with the terrain 110. The crash protection system(s) 116 can include, for example, energy absorber(s) 117 and supplemental restraint system(s) 121 associated with the seat(s) 111, damper(s) 119 associated with the landing gear 108 of the aircraft 100, the external airbag(s) 107 disposed below a bottom of the aircraft 100, and load limiters 103 that support the major mass items (engines, transmission, etc.) of the aircraft 100. The controllers of the example crash protection system(s) 116 can include a seat controller 118 to activate the energy absorber(s) 117 and supplemental restraint system(s) 121 to reduce forces experienced the occupant(s) of the seat(s) 111 (e.g., by controlling an energy absorber servo-motor to achieve a particular stroke load and/or seat displacement); a landing gear controller 120 to provide for absorption of impact energy via the damper(s) 119 associated with the aircraft landing gear 108 (e.g., by controlling hydraulic valve position); a load limit controller 122 to control loads from the major mass item(s) to the fuselage 102 of the aircraft 100, such as the engine of the aircraft 100; and an airbag controller 124 to control deployment of the external airbag(s) 107 installed in the aircraft 100.

The example impact prediction analyzer 114 uses the sensor data to predict parameters of the aircraft 100 at impact, such as aircraft attitude, velocity, acceleration, and weight. The impact prediction analyzer 114 uses GPS data to determine properties of the terrain 110 over which the aircraft 100 is expected to be flying when the aircraft 100 contacts the terrain 110, such as terrain topography. The impact prediction analyzer 114 determines the amount of energy of the aircraft 100 to be absorbed by the respective crash protection systems 116. The impact prediction analyzer 114 dynamically adjusts the instruction(s) provided to the crash protection system controller(s) 118, 120, 122, 124 based on the sensor data obtained from the sensor(s) 112 at sampling intervals and updated crash impact prediction models generated by the analyzer 114. Thus, the impact prediction analyzer 114 of FIG. 1 provides for a vehicle management system that optimizes crash protection for the occupant(s) of the aircraft 100 and the structural integrity of the aircraft 100 via coordinated integration of the crash protection systems 116.

Figure 2:
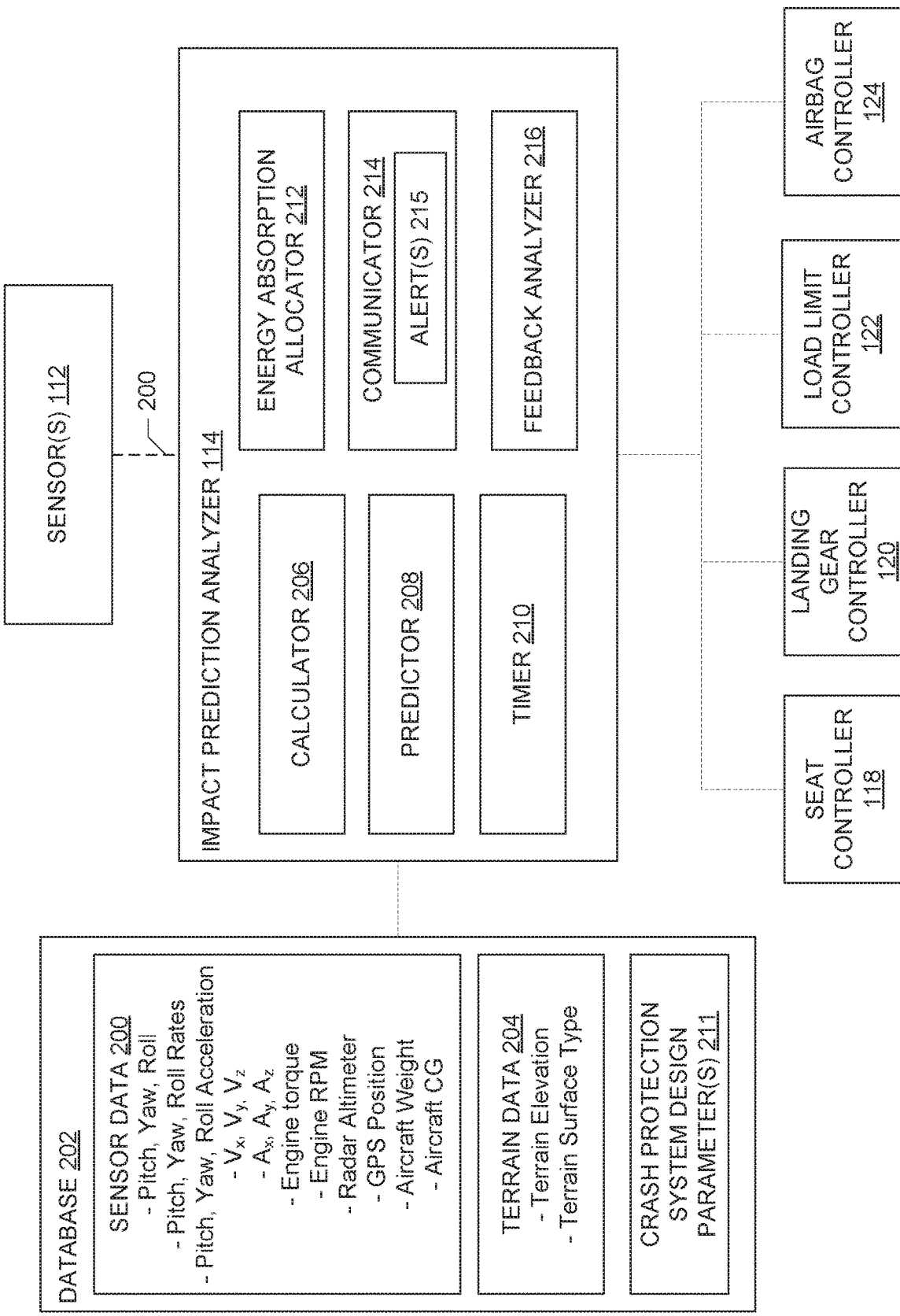
FIG. 2 is a block diagram of an example implementation of an impact prediction analyzer of FIG. 1.

FIG. 2 is a block diagram of an example implementation of the impact prediction analyzer 114 of FIG. 1. As mentioned above, the impact prediction analyzer 114 receives sensor data 200 from the sensor(s) 112 during flight of the aircraft 100. The sensor data 200 can be transmitted from the sensor(s) 112 to the impact prediction analyzer 114 substantially continuously or at predefined intervals based on, for instance, sensor type and user setting(s) for the sensor(s) 112. The sensor data 200 is stored in a database 202. The database 202 can be implemented by the impact prediction analyzer 114 and/or be in a location that is accessible to the impact prediction analyzer 114. As shown in FIG. 2, the sensor data 200 for the aircraft 100 can include, for example, pitch, yaw, roll data; pitch, yaw, roll acceleration data; velocity data (in the x-y-z directions); acceleration data (in the x-y-z directions); engine torque data; engine RPM data; radar altimeter data; GPS position data; aircraft weight data; and aircraft center of gravity data. The database 202 can store types of sensor data received from the sensor(s) 112 other than the types shown in FIG. 2.

The example database 202 also stores terrain data 204. The terrain data 204 can include elevation data, terrain surface type (e.g., land, water, rock, sand), and/or other types of terrain topography information. The terrain data 204 stored in the database 202 can include, but is not limited to, terrain data for the terrain that the aircraft 100 is expected to fly over for a particular flight path of the aircraft 100. In some examples, the terrain data 204 is transmitted to the database 202 during flight of the aircraft 100. In other examples, the terrain data 204 is stored in the database 202 prior to flight of the aircraft 100.

The impact prediction analyzer 114 of FIG. 2 includes a calculator 206. As disclosed herein, the calculator 206 executes one or more algorithms using the sensor data 200 and, in some examples, the terrain data 204, to determine whether the aircraft 100 is moving toward or away from the ground (e.g., based on vertical velocity and acceleration data $V_z$, $A_z$). If the calculator 206 determines that the aircraft 100 is moving toward the ground, the calculator 206 determines whether the aircraft 100 has sufficient altitude to avoid a crash.

The impact prediction analyzer 114 of FIG. 2 includes a predictor 208. The predictor 208 predicts whether or not the aircraft 100 will experience a crash event based on the analysis of, for instance, the aircraft acceleration, velocity, and altitude by the calculator 206 and one or more particular (e.g., predefined) rules. The rule(s) can include threshold(s) for the sensor data and/or the values derived therefrom that indicate that the aircraft 100 is likely to crash if the threshold(s) are satisfied or not satisfied. In the example of FIG. 2, if the predictor 208 predicts a crash impact, the calculator 206 determines (e.g., based on one or more algorithms) a predicted time to impact, a predicted aircraft velocity at impact, a predicted aircraft attitude at impact, a predicted gross weight of the aircraft, a predicted center of gravity of the aircraft, and aircraft system kinetic energy (e.g., based on one or more algorithms). The calculator 206 can determine the aircraft system kinetic energy based on the predicted velocity at impact and current aircraft weight. Also, the if the predictor 208 predicts a crash impact, the predictor 208 can predict the type of surface that the aircraft 100 is likely to impact based on the terrain data 204 and GPS sensor data.

The impact prediction analyzer 114 of FIG. 2 includes a timer 210 to determine a time at which to instruct the seat controller 118, the landing gear controller 120, the load limit controller 122, and/or the airbag controller 124 to activate the corresponding crash protection system(s) 116 controlled by each controller 118, 120, 122, 124 (e.g., seat energy absorber(s) 117, landing gear damper(s) 119, airbag(s) 107, etc.). In the example of FIG. 2, the timer 210 considers design parameters of the respective crash protection systems, such as a minimum amount of time needed to activate a respective system and an amount of time an activated system can maintain readiness once activated to absorb energy. For example, there is a finite time at which the airbag(s) are inflated before the airbag(s) begin to deflate. In the example of FIG. 2, crash protection system design parameter(s) 211 for the crash protection system(s) 116 are stored in the database 202, where the parameter data can be accessed by the timer 210. The system design parameter(s) 211 can be specific for the type and model of the aircraft 100.

The impact prediction analyzer 114 of FIG. 2 includes an energy absorption allocator 212. The energy absorption allocator 212 compares the kinetic energy of the aircraft 100 determined by the calculator 206 with the energy absorption capabilities of one or more components of the aircraft 100, such as the major mass item load limiters 103, the energy absorber(s) 117 of the seat(s) 111, the damper(s) 121 of the landing gear 108, etc. The energy absorption allocator 212 determines which of the crash protection system(s) 116 to activate to distribute the kinetic energy between the crash protection system(s) to maximize effectiveness of the crash protection system(s) 116 in absorbing the energy. The example energy absorption analyzer 212 can analyze the terrain data 204 and GPS sensor data to consider whether particular crash protection system(s) are sufficient to absorb the kinetic energy (e.g., landing gear) and how the energy is likely to be distributed across the aircraft 100 in view of the terrain surface type over which the aircraft 100 is flying and is likely to encounter on impact.

The energy absorption allocator 212 of the example of FIG. 2 can determine energy absorption settings for one or more of the crash protection systems 116 based on the predicted kinetic energy, impact velocity, impact attitude, and impact weight of the aircraft 100 and properties such as aircraft type, landing gear specifications, etc. For example, the energy absorption allocator 212 can determine initial stroke loads for the energy absorber(s) 117 of the seat(s) 111 of the aircraft 100.

The impact prediction analyzer 114 of FIG. 2 includes a communicator 214 to generate instructions for the crash protection system controller(s) 118, 120, 122, 124 and to transmit the instructions to the controller(s) 118, 120, 122, 124. The instructions can include, for example, instructions to activate the crash protection system(s) 116 (e.g., to deploy the external airbag(s) 107). In some examples, the instructions include settings for one or more parameters of the crash protection system(s) 116, such as stroke loads for seat energy absorber(s), damping force(s) for damper(s) associated with the landing gear, etc. In some examples, in addition to or as an alternative to the activation instructions, the communicator 214 generates one or more alerts 215 for the aircraft crew based on the prediction of the crash event by the predictor 208. The alert(s) 215 can be transmitted by the communicator 214 to, for instance, audio and/or visual output devices associated with the aircraft 100.

The example impact prediction analyzer 114 of FIG. 2 includes a feedback analyzer 216. Based on sensor data 200 received from the sensor(s) 112 during flight of the aircraft 100, the feedback analyzer 216 instructs the calculator 206, the predictor 208, and/or the energy absorption allocator 212 to evaluate (or re-evaluate) the crash impact predictions based on the most recently sampled sensor data indicative of aircraft conditions. The feedback analyzer 216 can determine whether there are any changes to the kinetic energy of the aircraft in view of the most recent sensor data that might affect which of the crash protection system(s) 116 are activated, the distribution of the kinetic energy between the crash protection system(s) 116, etc. The communicator 214 transmits any new and/or revised instructions to the crash protection system controller(s) 118, 120, 122, 124 based on the feedback.

In the example of FIG. 2, once activated, the controller(s) 118, 120, 122, 124 can adjust the settings and/or parameters of the respective crash protection system(s) 116 based on data received from sensors associated with the respective crash protection system(s) 116 (e.g., damping sensor(s)) to maximize the effectiveness of the crash protection system(s) during and/or after impact. For example, the seat controller 118 can activate the supplemental restraint system(s) 121 and can also control the seat energy absorber(s) 117 as disclosed in U.S. application Ser. No. 14/883,912, which is hereby incorporated by reference. The landing gear controller 120 can control the landing gear damper(s) 119 as disclosed in U.S. Pat. No. 9,708,057, which is hereby incorporated by reference. As another example, the load limit controller 122 can control the loads exerted by the major mass items on the aircraft fuselage 102 as disclosed in U.S. application Ser. No. 15/239,294, which is hereby incorporated by reference.

While an example manner of implementing the impact prediction analyzer 114 of FIG. 1 is illustrated in FIG. 2, one or more of the elements, processes and/or devices illustrated in FIG. 2 may be combined, divided, re-arranged, omitted, eliminated and/or implemented in any other way. Further, the example database 202, the example calculator 206, the example predictor 208, the example timer 210, the example energy absorption allocator 212, the example communicator 214, the example feedback analyzer 216 and/or, more generally, the example impact prediction analyzer 114 of FIGS. 1 and 2 may be implemented by hardware, software, firmware and/or any combination of hardware, software and/or firmware. Thus, for example, any of the example database 202, the example calculator 206, the example predictor 208, the example timer 210, the example energy absorption allocator 212, the example communicator 214, the example feedback analyzer 216 and/or, more generally, the example impact prediction analyzer 114 of FIGS. 1 and 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 202, the example calculator 206, the example predictor 208, the example timer 210, the example energy absorption allocator 212, the example communicator 214, the example feedback analyzer 216 and/or, more generally, the example impact prediction analyzer 114 of FIGS. 1 and 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example impact prediction analyzer 114 of FIGS. 1 and 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3A:
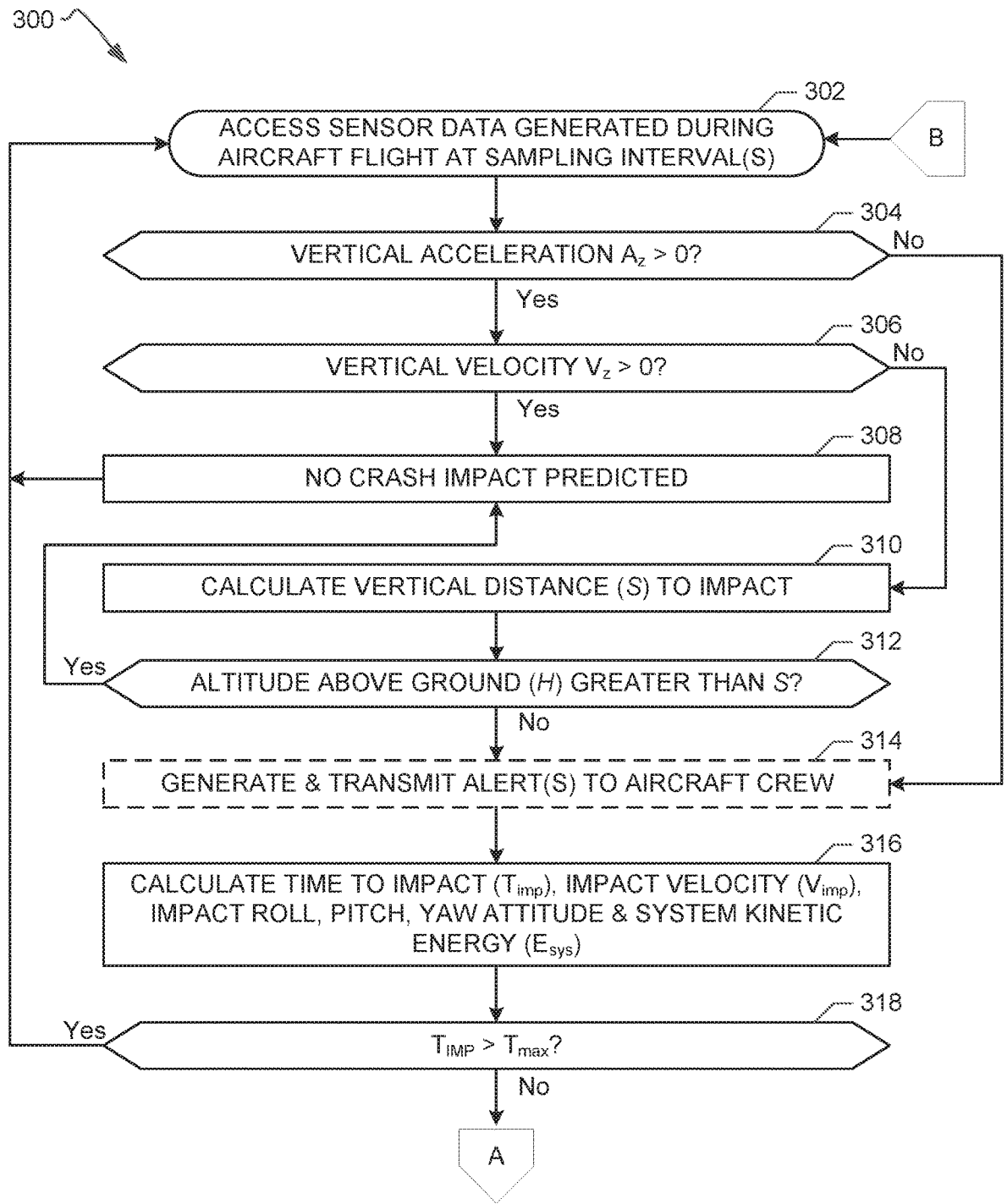
FIGS. 3A and 3B include a flowchart representative of machine readable instructions which may be executed to implement the example impact prediction analyzer of FIG. 2.
Figure 3B:
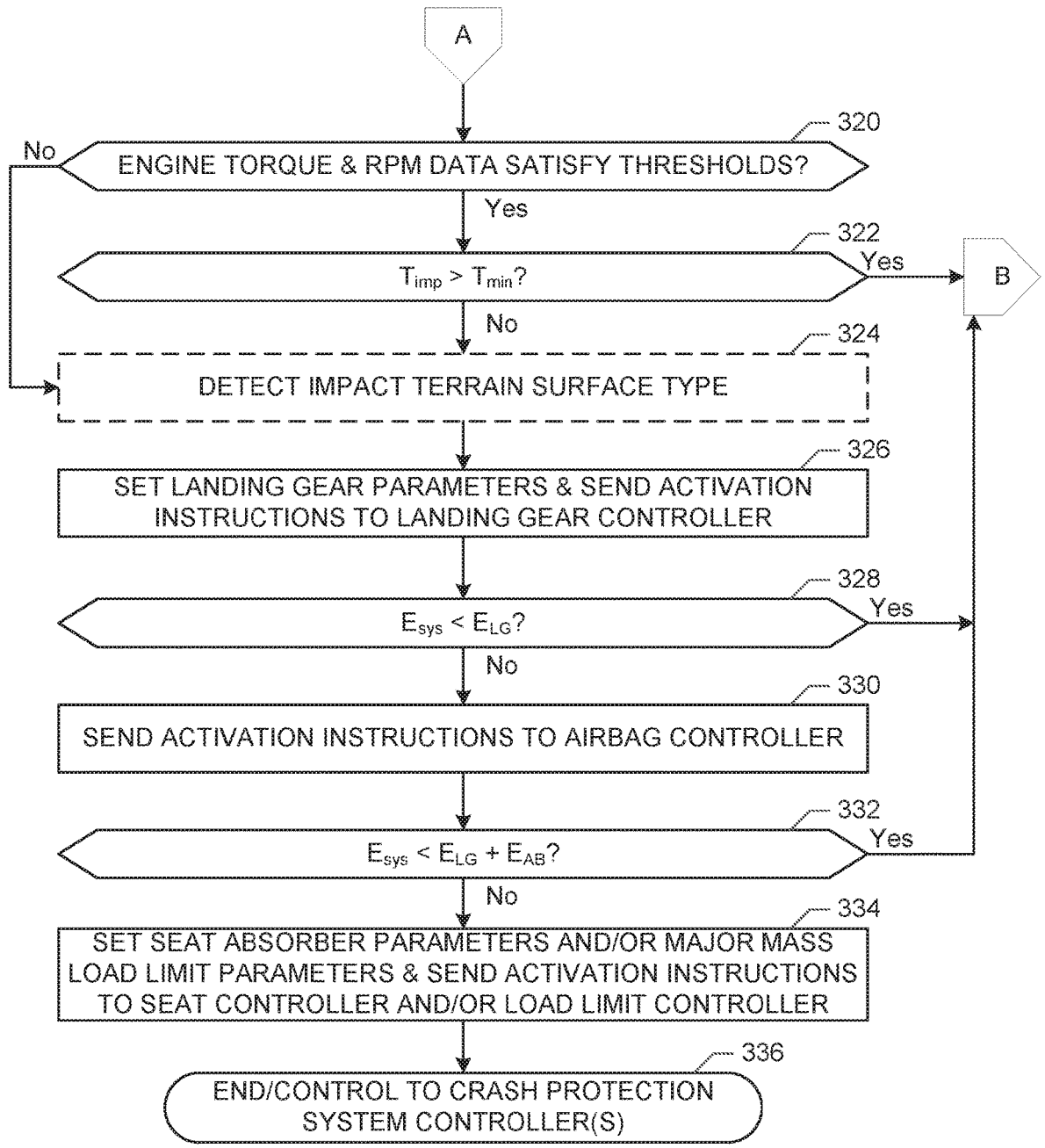

A flowchart representative of example machine readable instructions that may be used to implement the example impact prediction analyzer 114 of FIGS. 1 and 2 is shown in FIGS. 3A and 3B. The machine readable instructions may be a program or portion of a program for execution by a processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIGS. 3A and 3B, many other methods of implementing the example impact prediction analyzer 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3A and 3B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIGS. 3A and 3B include a flowchart of an example method 300 to predict a crash impact event and to manage one or more crash protection systems in response to the prediction. The example method 300 of FIGS. 3A and 3B can be implemented by the example impact prediction analyzer 114 of FIGS. 1 and 2.

The example method 300 of FIGS. 3A and 3B begins with accessing sensor data generated during flight of an aircraft (e.g., the aircraft 100 of FIG. 1) (block 302). For example, the impact prediction analyzer 114 receives the sensor data 200 from the sensor(s) 112 of the aircraft 100 of FIG. 1. The sensor data 200, which can be stored in the database 202 of FIG. 2, can include data generated during flight of the aircraft 100 over the terrain 110, such as pitch, yaw, roll; velocity (e.g., x-y-z velocity); aircraft weight; GPS position, etc. The impact prediction analyzer 114 can access the sensor data at predefined sampling intervals (e.g., every millisecond).

The example method 300 includes determining whether the vertical acceleration $A_z$ is positive upwards (e.g., greater than zero) (block 304). For example, the calculator 206 of FIG. 2 can analyze the vertical acceleration data received from the sensor(s) 112 to determine if $A_z > 0$.

The example method 300 includes determining whether the vertical velocity $V_z$ is positive upwards (e.g., greater than zero) (block 306). For example, the calculator 206 can analyze the vertical velocity data received from the sensor(s) 112 to determine if $V_z > 0$.

In the example of FIGS. 3A and 3B, if both the vertical acceleration and the vertical velocity are greater than zero, then no crash impact is predicted (block 308). In examples in which calculator 206 determines that both the vertical acceleration and vertical velocity are greater than zero, the predictor 208 determines that the aircraft 100 is accelerating upward (e.g., rotor lift>gross weight of the aircraft) and moving away from the ground. Thus, the predictor 208 determines that the aircraft will not experience a crash. The example method 300 of FIGS. 3A and 3B returns to accessing sensor data at the next sampling interval as part of updating of the prediction analysis in view the most recent sensor data (block 302). The retrieval of the sensor data at the sampling interval(s) can be initiated by the feedback analyzer 216 of FIG. 2.

If vertical acceleration is greater than zero but vertical velocity is less than zero, then the aircraft is moving toward the ground and the example method 300 includes calculating the a vertical distance S for the aircraft velocity to be reduced to zero at the current vertical (upward) acceleration level (block 310). For example, the if vertical acceleration is greater than zero but vertical velocity is less than zero, the predictor 208 of FIG. 2 determines that there is a possibility that the aircraft 100 can experience a crash depending on the magnitude of the vertical (downward) velocity, upward acceleration, and altitude H above ground. The example calculator 206 can compute the vertical distance S based on the following equation:

$$S=(V_z^2)/(2*A_z) \quad \text{(Eq. 1)}.$$

The example method 300 includes comparing the aircraft altitude H to the vertical distance S (block 312). In the example of FIG. 2, if H>S, then the predictor 208 determines that the aircraft 100 has sufficient altitude and will not experience a crash (block 308). The example method 300 returns to accessing sensor data at the next sampling interval (block 302).

If H<S, then the predictor 208 determines that the aircraft 100 does not have sufficient altitude to reduce the vertical velocity to zero and predicts that the aircraft 100 is likely to experience a crash impact event. Also, if the vertical acceleration is less than zero (block 304), then the predictor 208 predicts that a crash event is likely regardless of the direction of the vertical velocity. Based on the sensor data sampled, for example, every millisecond, the predictor 208 projects aircraft behavior with respect to the potential for a crash for an upcoming period of time, such as 20-30 seconds ahead in time.

In some examples, if a crash event is predicted, the example method 300 of FIGS. 3A and 3B includes generating and transmitting alert(s) to the aircraft crew (block 314). The communicator 214 of the impact prediction analyzer 114 can generate and deliver alert(s) 215 (e.g., visual, audio, and/or tactile alert(s)) to notify the aircraft crew that current aircraft conditions may result in an impact event to give the aircraft crew an opportunity to recover the aircraft 100.

In the event the aircraft crew is not able to recover the aircraft 100 and avoid an impact event (e.g., as determined based on sensor data measured a time period following the alert), the example method 300 continues to evaluate the likelihood of an impact event and prepare the aircraft 100 for impact. In some examples, the example method 300 evaluates the likelihood of an impact event without waiting to see if the alert(s) result in changed aircraft conditions (e.g., depending on the length of the sampling interval(s) for obtaining sensor data).

The example method includes calculating a predicted time to impact $T_{imp}$, aircraft velocity at impact $V_{imp}$, aircraft attitude (roll, pitch, yaw) at impact, and aircraft system kinetic energy ($E_{sys}$) using the predicted impact velocity $V_{imp}$ and the current aircraft gross weight (block 316). For example, the calculator 206 can calculate the impact velocity $V_{imp}$, the time to impact $T_{imp}$, and the aircraft system kinetic energy using the following equations:

$$V_{imp}=(V_z^2-2*A_z*H)^{1/2} \quad \text{(Eq. 2);}$$

$$T_{imp}=(V_z-V_{imp})/A_z \quad \text{(Eq. 3); and}$$

$$E_{sys}=0.5*(GW)*(V_{imp}^2) \quad \text{(Eq. 4).}$$

Equations 1-4 can be based on rigid body dynamics for linear motion. The equations assume that aircraft acceleration remains constant at the value obtained from the current sensor data sampling interval up to the predicted crash impact. To account for any changes in acceleration of the aircraft 100, the example method 300 includes checkpoints so that the aircraft acceleration data used in the prediction(s) corresponds to the acceleration of the aircraft as close or as substantially close to the predicted time of impact $T_{imp}$ as possible. In particular, the example method 300 includes comparing the predicted time of impact $T_{imp}$ with crash protection system design parameters representative of the amount of time that the readiness of a crash protection system can be maintained and the minimum time needed to activate a particular crash protection system.

The example method 300 includes determining whether the predicted time to impact, $T_{imp}$, is greater than a maximum amount of time $T_{max}$ the readiness of a crash protection system can be maintained (block 318). For example, the timer 210 of the impact prediction analyzer 114 of FIG. 2 can retrieve the crash protection system design parameter(s) 211 from the database 202, which can include respective $T_{max}$ values for the crash protection system(s) 116. For example, for the crash protection system 116 including the external airbag(s) 107, $T_{max}$ represents the maximum time the airbag pressure can be maintained after an airbag 107 is inflated. If the calculator 206 determines that $T_{imp}>T_{max}$ for a particular crash protection system 116, then the timer 210 determines that there is sufficient time to deploy the crash protection system 116. As such, the communicator 214 of the impact prediction analyzer 114 of FIG. 2 refrains from instructing the crash protection system(s) to activate. Instead, as shown in FIG. 3A, the method 300 returns to accessing sensor data and, thus, updating the aircraft acceleration data, at the next sampling interval (block 302).

In the example of FIGS. 3A and 3B, if $T_{imp}<T_{max}$, the example method 300 includes evaluating the engine torque and engine RPM data (block 320). For example, the calculator 206 can determine if the engine torque and engine RPM sensor data satisfies particular (e.g., predetermined) threshold(s). The threshold(s) can be indicative of expected engine torque and RPM at different phases of flight (e.g., under non-impact conditions) for the aircraft 100. The calculator 206 evaluates the engine torque and engine RPM data to verify the fidelity of the aircraft kinematic sensor data (e.g., velocity, acceleration) before activating the crash protection system(s) 116. Thus, the example method 300 includes built-in checks to verify the prediction of a crash impact in an effort to avoid taking unnecessary action that affects aircraft behavior and quality of ride.

In the example of FIGS. 3A and 3B, if the engine torque and the engine RPM data satisfy the thresholds, there may be an issue with the fidelity of the aircraft kinematic data. In such instances, the example method 300 includes comparing the predicted time to impact $T_{imp}$ with minimum time $T_{min}$ needed to activate a particular crash protection system 116 (block 322). For example, the timer 210 determines that $T_{imp}>T_{min}$, then the timer 210 determines that there is still sufficient time to deploy the crash protection system(s) 116 and the system(s) 116 are not yet activated. The example method 300 returns to accessing the sensor data at the next sampling interval (block 302) in an effort to better align the kinematic sensor data with the engine data.

If the engine torque and RPM data do not satisfy the respective thresholds, then the example method 300 proceeds with identifying one or more of the crash protection system(s) for activation. In some examples, the method 300 of FIGS. 3A and 3B includes detecting a type of terrain that that the aircraft as part of preparing the crash protection system(s) for deployment (block 324). For example, the predictor 208 analyzes the terrain data 204 stored in the database 202 based on GPS position sensor data to predict the type of terrain that the aircraft is likely to encounter upon impact (e.g., water, soft soil, rock). As disclosed herein, in some examples, the impact prediction analyzer 114 considers the terrain type in anticipation of the crash impact event.

The example method 300 of FIGS. 3A and 3B includes determining parameters such as stroke loads for the landing gear and activating the landing gear to provide for vehicle crash protection (block 326). If the calculator 206 and/or the timer 210 determine that the engine torque and RPM data is consistent with the kinematic sensor data indicating that the aircraft 100 is likely to experience an impact event, the impact prediction analyzer 114 prepares to activate the crash protection system(s) 116. For example, the energy absorption allocator 212 determines initial stroke load settings for the damper(s) 119 of the landing gear 108 of the aircraft 100 of FIG. 1. The energy absorption allocator 212 can determine the initial stroke loads for the landing gear damper(s) 119 based on, for example, aircraft type, landing gear configuration, predicted aircraft velocity at impact, predicted aircraft attitude at impact, and predicted aircraft gross weight at impact. The communicator 214 transmits instructions (including the initial energy absorption setting(s)) to the landing gear controller 120 to activate the landing gear 108.

In other examples, the energy absorption allocator 212 can select to activate a different crash protection system 116 at block 324 in addition to or as an alternative to the landing gear 108 based on, for example, the predicted aircraft weight at impact, the aircraft type, the terrain data, etc. For example, the energy absorption allocator 212 can the type of terrain impact surface in setting the parameter(s) of the crash protection system(s) 116. If the terrain data 204 indicates that the aircraft 100 is likely to crash on soft soil, the energy absorption allocator 212 may adjust the damping force(s) associated with the landing gear damper(s) 119 accordingly (e.g., as compared to a hard surface) and/or select to activate another crash protection system at block 326.

The example method 300 includes comparing the (e.g., total) aircraft kinetic energy $E_{sys}$ with the energy absorption capabilities of the landing gear (i.e., the damper(s) of the landing gears), $E_{LG}$ (block 328). For example, if the energy absorption allocator 212 determines that $E_{sys} < E_{LG}$, the energy absorption allocator 212 determines that the damper(s) 119 of the landing gear(s) 108 are sufficient to absorb the kinetic energy of the aircraft 100. Accordingly, the communicator 214 refrains from activating other crash protection system(s) 116. The example method 300 returns to accessing sensor data to update the crash impact predictions for the aircraft 100 based on current sensor data (block 302).

In the example of FIGS. 3A and 3B, if the aircraft kinetic energy is not less than the energy absorption capabilities of the landing gear, then the example method 300 includes activating additional crash protection system(s) 116, such as the airbag(s) (block 330). For example, the communicator 214 transmits instructions for the airbag controller 124 to activate the external airbag(s) 107. The communicator 214 can activate other crash protection system(s) 116 in addition or as an alternative to the external airbag(s) 107.

The example method 300 includes comparing the total aircraft kinetic energy $E_{sys}$ with the combined energy absorption capabilities of the landing gear damper(s) ($E_{LG}$) and the airbag(s) ($E_{AB}$) (block 332). If the energy absorption allocator 212 determines that $E_{sys} < E_{LG} + E_{AB}$, the energy absorption allocator 212 determines that the landing gear damper(s) 119 and the external airbag(s) 107 are sufficient to absorb the kinetic energy of the aircraft 100. Accordingly, the communicator 214 refrains from activating other the crash protection system(s) 116. The example method 300 returns to accessing sensor data to update the crash impact predictions for the aircraft 100 based on current sensor data (block 302).

In the example of FIGS. 3A and 3B, if the aircraft kinetic energy is not less than the combined energy absorption capabilities of the landing gear damper(s) and airbag(s), the method 300 includes activating the seat energy absorber(s), the supplemental restraint system(s), and/or major mass item load limiter(s) (block 334). If the energy absorption allocator 212 determines that $E_{sys} > E_{LG} + E_{AB}$, the predictor 208 predicts that the fuselage 102 of the aircraft 100 is likely to impact the terrain 110, which can create high aircraft accelerations that can result in injuries to the occupant(s) of the aircraft 100. Accordingly, the energy absorption allocator 212 determines initial energy absorption parameters or settings for the seat energy absorber(s) 117, the supplement restraint system(s) 121, and/or major mass item load limiter(s) 103 (e.g., stroke load(s), load limit(s)) based on aircraft type, energy absorbing characteristics of the aircraft frame and/or seat, occupant size, predicted aircraft velocity at impact, predicted aircraft attitude at impact, and predicted aircraft gross weight at impact.

In some examples, the energy absorption allocator 212 analyzes the impact terrain surface type when considering the behavior of the aircraft 100 upon impact and how the terrain can affect the distribution of kinetic energy between the crash protection system(s) 116. As an example, if the predictor 208 determines that the aircraft 100 is likely to crash on soft soil, the energy absorption allocator 212 recognizes that the landing gear 108 may not be as effective in absorbing energy as compared to if the aircraft 100 were to impact hard ground. The energy absorption allocator 212 can assign more kinetic energy to be absorbed by the seat energy absorber(s) 117 and adjust the parameters of the landing gear and seat crash protection systems accordingly.

In the example of FIGS. 3A and 3B, after the crash protection system(s) 116 have been activated, the example method 300 ends with handing off control to the controller(s) 118, 120, 122, 124 of the active crash protection system(s) 116 (block 336). The controller(s) 118, 120, 122, 124 of the active crash protection system(s) 116 can control and/or adjust the setting(s) initially determined by the impact prediction analyzer 114 based on local feedback received by sensor(s) of the crash protection system(s) 116.

Figure 4:
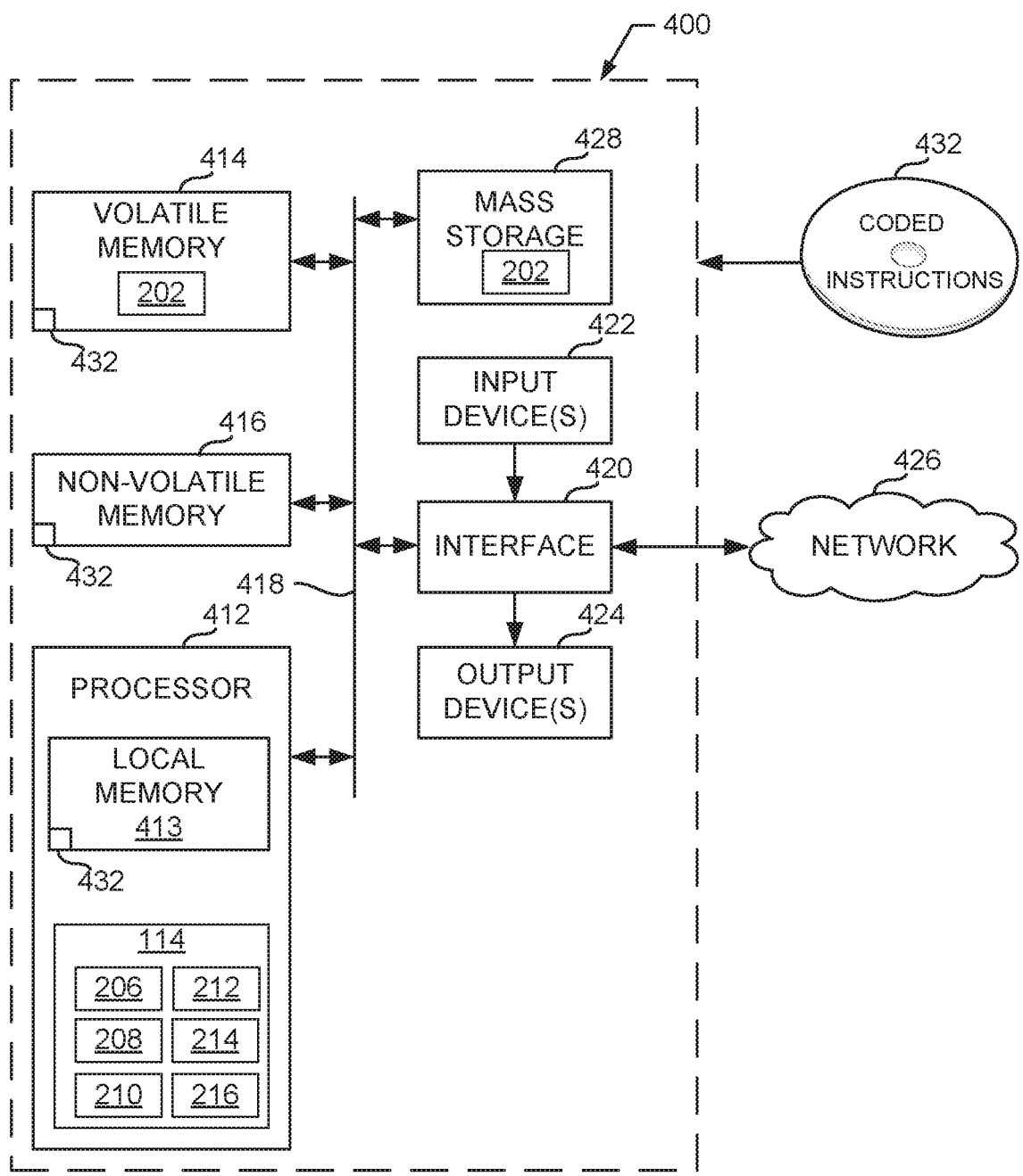
FIG. 4 is a block diagram of an example processing platform structured to execute the instructions of FIGS. 3A and 3B to implement the impact prediction analyzer of FIG. 2.

FIG. 4 is a block diagram of an example processor platform 400 capable of executing instructions to implement the method of FIGS. 3A and 3B and/or to implement the impact prediction analyzer 114 of FIGS. 1 and 2. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the calculator 206, the predictor 208, the timer 210, the energy absorption allocator 212, the communicator 214, and the feedback analyzer 216.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

Coded instructions 432 of FIG. 4 may be stored in the mass storage device 428, in the volatile memory 414, in the non-volatile memory 416, and/or on a removable non-transitory computer readable storage medium such as a CD or DVD.

From the foregoing, it will be appreciated that example apparatus, methods, and systems have been disclosed that predict whether a crash impact event is imminent for a vehicle based on vehicle conditions and dynamically respond to the prediction of an impact event by activating one or more crash protection systems of the vehicle (e.g., landing gear, external airbags, seat energy absorbers). Examples disclosed herein provide for integration of the vehicle crash protection systems to optimize allocation of the vehicle impact energy to be absorbed by each system. Examples disclosed herein consider factors such as impact surface type (e.g., terrain type) with respect to the response of the aircraft and/or crash protection systems to maximize an effectiveness of the crash protection systems in mitigating damage to vehicle occupant(s) and the vehicle.

An apparatus disclosed herein includes a predictor to generate a prediction of an impact event for a vehicle based on data received from sensors of the vehicle, an energy absorption allocator to determine an amount of vehicle energy to be absorbed by a crash protection system of the vehicle upon the impact event, and a communicator to generate an instruction to activate the crash protection system based on the prediction and the amount of vehicle energy to be absorbed by the crash protection system and transmit the instruction to a controller of the crash protection system.

In some examples, the crash protection system includes an energy absorber for a seat of the vehicle.

In some examples, the predictor is to generate the prediction based one or more of vertical velocity sensor data or vertical acceleration sensor data.

In some examples, the predictor is to further predict an impact terrain for the vehicle and the energy absorption allocator is to determine the amount of vehicle energy to be absorbed by the crash protection system based on the impact terrain.

In some examples, the apparatus further includes a calculator to calculate a time to impact and a timer to identify a time to activate the crash protection system. In such examples, the communicator is to transmit the instruction based on the time to impact and the time to activate.

In some examples, the crash protection system is a first crash protection system of the vehicle and n the energy absorption allocator is to determine a first amount of the vehicle energy to be absorbed by the first crash protection system and a second amount of the vehicle energy to be absorbed by a second crash protection system of the vehicle.

In some examples, the communicator is to generate an instruction to activate the second crash protection system based on a total amount of the vehicle energy and the first amount of the vehicle energy to be absorbed by the first crash protection system.

An example method disclosed herein includes predicting, by executing an instruction with a processor, an impact event for an aircraft based on sensor data received from sensors of the aircraft; determining, by executing an instruction with the processor, respective amounts of aircraft energy to be absorbed by a first crash protection system of the aircraft and a second crash protection system of the aircraft; and selectively activating, by executing an instruction with the processor, the first crash protection system and the second crash protection system based on the respective amounts of energy to be absorbed by each of the first and second crash protection systems.

In some examples, the method further includes generating an alert based on the predicting of the impact event.

In some examples, the method further includes determining a time to impact for the aircraft; performing a comparison of the time to impact to an amount of time to activate the first crash protection system; and one of activating or refraining from activating the first crash protection system based on the comparison.

In some examples, the predicting includes performing a comparison of a distance of the aircraft to impact a terrain and an altitude of the aircraft relative to the terrain.

In some examples, the method further includes predicting a type of terrain the aircraft is to impact. In such examples, the selectively activating the first crash protection system or the second crash protection system is further based on the type of terrain.

In some examples, the first crash protection system includes one or more of an energy absorber for a seat of the aircraft, a supplemental restraint system for the seat of the aircraft, or a major mass item load limiter and the method further includes generating at least one instruction including a stroke load for the seat energy absorber, a limit load for the major mass item load limiter, or an activation signal for the seat supplemental restraint system.

In some examples, the method further includes activating the first crash protection system; performing a comparison of the amount of the aircraft energy to be absorbed by the first crash protection system and a total amount of the aircraft energy; and activating the second crash protection system based on the comparison.

In some examples, the first crash protection system includes dampers for landing gear of the aircraft and the second crash protection system includes external airbags.

An example aircraft disclosed herein includes a plurality of sensors to generate sensor data during flight of the aircraft, a first controller to control a first crash protection system, a second controller to control a second crash protection system, and a third controller in communication with the first controller and the second controller. The third controller is to generate a prediction of a crash event for the aircraft based on the sensor data and transmit an instruction to at least one of the first controller to activate the first crash protection system or the second controller to activate the second crash protection system based on the prediction.

In some examples, the instruction includes an energy absorption parameter for the least at one of the first crash protection system or the second crash protection system.

In some examples, the third controller is to determine an impact terrain surface for the crash event. In such examples, the energy absorption parameter is to be based on the impact terrain surface.

In some examples, the sensor data includes engine torque data and the third controller is to determine if the engine torque data satisfies a threshold. In such examples, the third controller to further transmit the instruction based on the engine torque data satisfying the threshold.

In some examples, the aircraft further includes a fourth controller in communication with a third crash protection system. In such examples, the third controller is to transmit a second instruction to activate the fourth controller if an amount of aircraft impact energy to be absorbed by the first crash protection system and the second crash protection system is less than a total amount of aircraft impact energy.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a predictor to generate a prediction of an impact event for a vehicle based on data received from sensors of the vehicle;
an energy absorption allocator to:
determine a first amount of vehicle energy to be absorbed by a first crash protection system of the vehicle upon the impact event; and
a second amount of the vehicle energy to be absorbed by a second crash protection system of the vehicle; and
a communicator to:
generate an instruction to activate the first crash protection system based on the prediction and the first amount of vehicle energy to be absorbed by the first crash protection system; and
transmit the instruction to a controller of the first crash protection system.

2. The apparatus of claim 1, wherein the first crash protection system includes an energy absorber for a seat of the vehicle.

3. The apparatus of claim 1, wherein the predictor is to generate the prediction based one or more of vertical velocity sensor data or vertical acceleration sensor data.

4. The apparatus of claim 1, wherein the predictor is to further predict an impact terrain for the vehicle and the energy absorption allocator is to determine the first amount of vehicle energy to be absorbed by the first crash protection system based on the impact terrain.

5. The apparatus of claim 1, further including a calculator to calculate a first time to impact and a timer to identify a second time to activate the first crash protection system, the communicator to transmit the instruction based on the first time to impact and the second time to activate.

6. The apparatus of claim 1, wherein the communicator is to generate an instruction to activate the second crash protection system based on a total amount of the vehicle energy and the first amount of the vehicle energy to be absorbed by the first crash protection system.

7. A method comprising:
predicting, by executing an instruction with a processor, an impact event for an aircraft based on sensor data received from sensors of the aircraft;
determining, by executing an instruction with the processor, respective amounts of aircraft energy to be absorbed by a first crash protection system of the aircraft and a second crash protection system of the aircraft; and
selectively activating, by executing an instruction with the processor, one or more of the first crash protection system or the second crash protection system based on the respective amounts of aircraft energy to be absorbed by each of the first and second crash protection systems.

8. The method of claim 7, further including generating an alert based on the predicting of the impact event.

9. The method of claim 7, further including:
determining a time to impact for the aircraft;
performing a comparison of the time to impact to an amount of time to activate the first crash protection system; and
one of activating or refraining from activating the first crash protection system based on the comparison.

10. The method of claim 7, wherein the predicting includes performing a comparison of a distance of the aircraft to impact a terrain and an altitude of the aircraft relative to the terrain.

11. The method of claim 7, further including predicting a type of terrain the aircraft is to impact, wherein the selectively activating of the one or more of the first crash protection system or the second crash protection system is further based on the type of terrain.

12. The method of claim 7, wherein the first crash protection system includes one or more of an energy absorber for a seat of the aircraft, a supplemental restraint system for the seat of the aircraft, or a major mass item load limiter and further including generating at least one instruction including a stroke load for the energy absorber for the seat, a limit load for the major mass item load limiter, or an activation signal for the supplemental restraint system for the seat in response to activation of the first crash protection system.

13. The method of claim 7, further including:
activating the first crash protection system;
performing a comparison of the amount of the aircraft energy to be absorbed by the first crash protection system and a total amount of the aircraft energy; and
activating the second crash protection system based on the comparison.

14. The method of claim 7, wherein the first crash protection system includes dampers for landing gear of the aircraft and the second crash protection system includes external airbags.

15. An aircraft comprising:
a plurality of sensors to generate sensor data during flight of the aircraft;
a first controller to control a first crash protection system;
a second controller to control a second crash protection system; and
a third controller in communication with the first controller and the second controller, the third controller to:
generate a prediction of a crash event for the aircraft based on the sensor data;
determine an impact terrain surface for the crash event; and
transmit an instruction to at least one of the first controller to activate the first crash protection system or the second controller to activate the second crash protection system based on the prediction, the instruction including an energy absorption parameter for the at least one of the first crash protection system or the second crash protection system, the energy absorption parameter to be based on the impact terrain surface.

16. An aircraft comprising:
a plurality of sensors to generate sensor data during flight of the aircraft, the sensor data including engine torque data;
a first controller to control a first crash protection system;
a second controller to control a second crash protection system; and
a third controller in communication with the first controller and the second controller, the third controller to:
generate a prediction of a crash event for the aircraft based on the sensor data; and
determine if the engine torque data satisfies a threshold; and
transmit an instruction to at least one of the first controller to activate the first crash protection system or the second controller to activate the second crash protection system based on the prediction and the engine torque data satisfying the threshold.

17. An aircraft comprising:
a plurality of sensors to generate sensor data during flight of the aircraft;
a first controller to control a first crash protection system;
a second controller to control a second crash protection system;
a third controller in communication with the first controller and the second controller; and
a fourth controller in communication with a third crash protection system, the third controller to:
generate a prediction of a crash event for the aircraft based on the sensor data;
transmit a first instruction to the first controller to activate the first crash protection system based on the prediction;
transmit a second instruction second controller to activate the second crash protection system based on the prediction; and
transmit a third instruction to activate the fourth controller when an amount of aircraft impact energy to be absorbed by the first crash protection system and the second crash protection system is less than a total amount of aircraft impact energy, transmit a second instruction to activate the fourth controller.

18. The apparatus of claim 1, wherein the predictor is to predict one or more of an impact velocity, an impact attitude, or an impact weight of the vehicle and the energy absorption allocator is to determine one or more of the first amount of the vehicle energy to be absorbed by the first crash protection system or the second amount of the vehicle energy to be absorbed by the second crash protection system based on the one or more of the impact velocity, the impact attitude, or the impact weight.

19. The aircraft of claim 16, wherein the threshold is defined based on engine torque data for a non-impact condition.

20. The aircraft of claim 17, wherein the third controller is to:
predict an impact terrain for the aircraft;
assign a first amount of aircraft impact energy to be absorbed by the first crash protection system based on the predicted impact terrain; and
assign a second amount of aircraft impact energy to be absorbed by the second crash protection system based on the predicted impact terrain.

* * * * *